(12) United States Patent
Blohm

(10) Patent No.: US 6,985,909 B2
(45) Date of Patent: Jan. 10, 2006

(54) MODIFIED CLASS LOADERS AND METHODS OF USE

(75) Inventor: Henning Blohm, Walldorf (DE)

(73) Assignee: SAP AG, Walldorf (DE)

( * ) Notice: Subject to any disclaimer, the term of this patent is extended or adjusted under 35 U.S.C. 154(b) by 501 days.

(21) Appl. No.: 10/331,180

(22) Filed: Dec. 27, 2002

(65) Prior Publication Data

US 2003/0163481 A1 Aug. 28, 2003

Related U.S. Application Data

(60) Provisional application No. 60/346,440, filed on Dec. 28, 2001.

(51) Int. Cl.
*G06F 17/30* (2006.01)

(52) U.S. Cl. .................................. 707/102; 707/103 R
(58) Field of Classification Search .............. 707/1–10, 707/100–104.1, 200–206; 717/166
See application file for complete search history.

(56) References Cited

U.S. PATENT DOCUMENTS 6,851,111 B2 * 2/2005 McGuire et al. ............ 717/166

FOREIGN PATENT DOCUMENTS

EP 0 969 361 A1 1/2000

OTHER PUBLICATIONS

Sheng Liang et al., Dynamic class loading in the JAVA virtual machine, (1998) ACM Presws, NY NY, pp. 36-44.*

Robert J. Walker, Efficient mapping of software system traces to architectural views (2000), IBM Press Canada, pp. 1-10.*

Fabien Baligand et al., A concrete solution of web services adaptability using policies and aspects, (2004), ACM Press, pp. 134-142.*

Zhenyu Qian, A formal specification of Java class loading, (2000) ACM Press, NY, NY, pp. 325-336.*

Gong, L., "Secure Java Class Loading," *IEEE Internet Computing*, Nov. 1998, pp.56-61.

Kurzyniec, D. et al., "Flexible Class Loader Framework: Sharing Java Resources in Harness System," Emory University, Dept. of Math and Computer Science, May 2001, pp. 375-384.

Liang, S. et al., "Dynamic Class Loading in the Java Virtual Machine," *ACM Sigplan Notices, Association for Computing Machinery*, (1998) 33(10):36-44.

* cited by examiner

*Primary Examiner*—Diane Mizrahi
(74) *Attorney, Agent, or Firm*—Fish & Richardson P.C.

(57) ABSTRACT

Methods and apparatus, including computer program products, implement a hierarchical arrangement of class loaders. Each class loader has a naming token, and each token driven class loader has one or more delegation tokens. A class definition request is received in a first, token driven class loader. If the first class loader has a parent class loader, the class definition is requested from the parent. If the parent is a token driven class loader, delegation tokens are used to delegate the class definition request to the parent. If the class definition is not obtained from a parent class loader, an attempt is made to obtain the class definition from the resources of the first class loader. If that also fails, the delegation tokens of the first class loader are used to find a matching child class loader and the class definition is requested from the matching child class loader.

8 Claims, 9 Drawing Sheets

MODIFIED CLASS LOADERS AND METHODS OF USE

This application claims priority under 35 U.S.C. §119 to commonly owned U.S. patent application No. 60/346,440, filed Dec. 28, 2001, the disclosure of which is incorporated herein by reference.

BACKGROUND

The present invention relates to data processing and more particularly to class loading in an object oriented programming language, such as the JAVA programming language.

In the JAVA 2 environment classes are loaded only when they are used for the first time, thereby reducing memory usage and improving system response time. During runtime, the JAVA Virtual Machine (JVM) invokes one or more class loaders to load any necessary classes. Class loaders are objects that can be defined using the JAVA 2 programming language and represent instances of the class java.lang. ClassLoader. The java.lang.ClassLoader.loadClass method accepts a class name as an argument, and returns a class object that is the runtime representation of a class type. These class loaders may be user defined. For example, a user may create a class loader that is capable of providing class definitions from a remote location or to assign security attributes to a class loaded from a particular source.

A class loader needs to provide class definition data in the form of a byte array, containing valid JAVA byte code, to the Virtual Machine implementation. It is up to the specific class loader implementation how to actually do this. Some may read that data from files in the file system, some others may fetch that data remotely over a network.

A class loader L may create a class object C by defining it directly or by delegating to another class loader. If L creates C directly, we say that L defines C or, equivalently, that L is the defining loader of C. When one class loader delegates to another class loader, the loader that initiates the loading is not necessarily the same loader that completes the loading and defines the class. If L creates C, either by defining it directly or by delegation, we say that L initiates the loading of C or, equivalently, that L is an initiating loader of C.

At run time, a class is identified by a pair consisting of the name of the class and the defining loader for the class. This can be expressed by the notation C=<N,L> where C is the class, N is the name of the class, and L is the defining loader for the class. A class can also be described in terms of the initiating loader for the class using the notation $C=N^L$ where C is the class, N is the name of the class, and L is the initiating loader for the class. A class loader may initiate the loading of a class but delegate to another class loader the task of actually loading the class. For example, L1 may initiate the loading of the class named D but may delegate the responsibility for actually loading the class named D to another class loader L2. If L2 is actually capable of providing the class, we end up having $D^{L1}=D^{L2}$. If L2 is the defining loader of the class then $D^{L1}=<D,L2>=D^{L2}$.

For the sake of simplicity, we will frequently restrict our explanations to provision of class definitions, although class loaders can be used in the JAVA 2 environment to provide arbitrary other binary resources in an equivalent fashion.

FIG. 1 illustrates the tree-based class loading delegation pattern implemented by the JAVA 2 environment. Each class loader in the class hierarchy has at most one parent loader. During the lifetime of a specific loader, its parent loader is not exchanged. When a class loader is asked to provide a class definition by a call to its loadClass method (step 100) it first checks if there is a parent class loader (step 105). If there is a parent class loader for the classloader, the parent class loader is first asked for a class definition (step 110). If the parent class loader returns a class definition (step 115), that class definition is returned (step 120). If the parent class loader is unable to provide a class definition or if there is no parent class loader, the class loader tries to obtain a class definition using its own resources (step 125). If a class definition is successfully obtained (step 130), the resulting class definition is returned (step 120). If a class definition is not obtained (step 130), the caller is notified that a class definition could not be found for the named class (step 135).

FIG. 2 shows an example of a class definition hierarchy that can be defined using the JAVA 2 class delegation pattern. There are four classe loaders C1 202, C2 204, C3 206 and C4 208. The four class loaders share a common provision provided by the parent class loader C0 200. This can be implemented in a JAVA 2 environment by arranging the classes in a tree such that the class loaders C1, C2, C3, and C4 are children of the class loader C0. The JAVA 2 class delegation pattern ensures that the knowledge of the common provision propagates from the root of the tree to its leaves.

In many JAVA based framework applications, the class loader tree approach is chosen to isolate the class loader relevant resources of framework entities (for example, applications running on the framework) from each other. This helps avoid class collisions on the one hand and enables dynamic loading and unloading of framework entities on the other hand. Since the different framework entities do not interfere with each others' class loader resources, the class definitions of the one entity may be loaded and unloaded without affecting other framework entities. A common parent loader enables provision of shared definition, commonly used Application Programming Interfaces (APIs) of the respective framework, for example.

However, in more complicated framework applications it is desirable that framework entities, as understood above, make use of each other by providing shared class definitions (and other class loader relevant resources), e.g., APIs. In order to so, a class loader assigned to a specific framework entity must be able to delegate to other class loaders that provide the APIs of other framework entities. The tree-based approach, as described above, is not sufficient when targeting for a dynamic model (loading and unloading of framework entities), where publishers of shared class definitions and users of shared class definitions are not known beforehand. Also, in complex situations, the tree-based approach is not sufficient to cover all valid combinations of use-relationships.

FIG. 3 illustrates an example of a resolving dependency relationships between framework entities using tree-based class loaders, once all the dependency relations are known. The example assumes a framework that supports API providers and applications that make use of APIs. The framework includes two API providers API1 and API2 and two applications App1 and App2. Application App1 depends on API1 and API2, while application App2 depends on API1 only and has conflicts (i.e., cannot work) with API2. The dependency relation is resolved by having a root class that provides API1 300. The root class loader 300 has a child class loader 305 that provides API2. Application App1 can be set up to use both API1 and API2 by adding a child loader 315 that has the loader for API2 305 as a parent. Application App2 can be set up to use only API1 by adding a child loader 310 that has the root class loader 300 as a parent.

However, the running framework may not be aware of all the dependency relations in advance. For example, App1 may be loaded at an earlier point of time before App2 is loaded. A requirement that App2, loaded after App1, depends on API2 and has conflicts with API1 might require the framework to choose a completely different setup. For example, the framework may have to unload App1 in order to load App2.

Alternatively, assume that there is a third application, App3, that depends on API2 but would have conflicts with API1. There is no valid tree-based setup that satisfies all dependencies.

SUMMARY OF THE INVENTION

In general, in one aspect, the invention provides methods and apparatus, including computer program products, for implementing a class loader in a hierarchical arrangement of class loaders. A method includes receiving a request for a class definition in a first class loader in an arrangement of class loaders, the first class loader being a token driven class loader, each class loader having a naming token, and each token driven class loader having one or more associated delegation tokens. The method determines whether the first class loader has a parent class loader and, if so, whether the parent class loader is a token driven class loader, and if the first class loader has a parent class loader, requests the class definition from the parent class loader, where if the parent class loader is a token driven class loader, requesting the class definition comprises using the delegation tokens to delegate the class definition request to the parent class loader. The method attempts to obtain the class definition from the resources of the first class loader, if the class definition is not obtained from a parent class loader. The method also uses the delegation tokens of the first class loader to find a matching child class loader and requests the class definition from the matching child class loader, if the class definition is not obtained from a parent class loader or from the resources of the first class loader.

Advantageous implementations of the invention include one or more of the following features. Using the delegation tokens to find a matching child class loader can include identifying a child class loader that has a naming token that matches one of the delegation tokens associated with the first class loader.

In general, in another aspect, the invention provides methods and apparatus, including computer program products, for providing a class definition. A method includes receiving a request for a class definition and delegation tokens associated with the request in a first class loader in an arrangement of class loaders, the first class loader being a token driven class loader, and each class loader having a naming token. The method determines whether the first class loader has a parent class loader and, if so, whether the parent class loader is a token driven class loader, and if the first class loader has a parent class loader, requests the class definition from the parent class loader, where if the parent class loader is a token driven class loader, requesting the class definition comprises using the delegation tokens to delegate the class definition request to the parent class loader. The method attempts to obtain the class definition from the resources of the first class loader, if the class definition is not obtained from a parent class loader. The method uses the delegation tokens of the first class loader to find a matching child class loader and requests the class definition from the matching class loader, if the class definition is not obtained from a parent class loader or from the resources of the first class loader.

Advantageous implementations of the invention include one or more of the following features. Using the delegation tokens to find a matching child class loader can include identifying a child class loader that has a naming token that matches one of the delegation tokens associated with the first class loader.

Advantages of the invention may include one or more of the following. The token driven class loader can be used to resolve complex dependency relations that cannot be resolved using tree-based class loaders. Framework applications may be designed to load and unload dynamically framework entities having complex dependency relations. The management of the class loader hierarchy and the class loader setup and runtime is easy because only the right set of delegation tokens must be computed for each class loader in order to resolve the dependency relations, rather than having to decide the placement of the class loader in the hierarchy of class loaders. The details of one or more implementations of the invention are set forth in the accompanying drawings and the description below. Other features and advantages of the invention will become apparent from the description, the drawings, and the claims.

DETAILED DESCRIPTION

Figure 4:
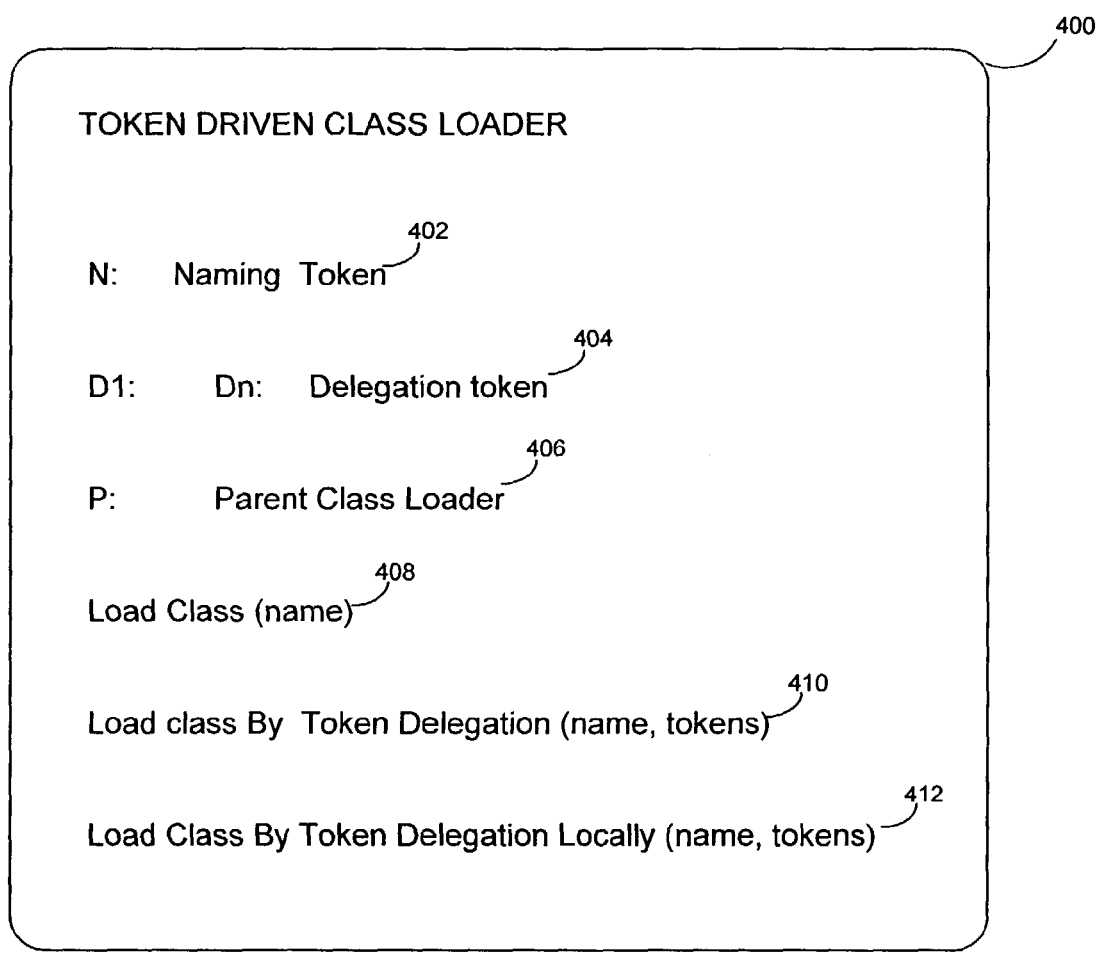
FIG. 4 illustrates a token driven class loader.

FIG. 4 illustrates a token driven class loader (TDCL). Each TDCL in the class loader hierarchy can have at most one naming token N (402) associated with it. Each TDCL can have at most one parent class loader associated with it. Each TDCL also carries a set of zero or more delegation tokens D1, . . . Dn (406). The naming token, the parent class loader and the delegation tokens are usually constant for the lifetime of the TDCL instance. In this description, a pseudo-code implementation of a TDCL performs at least three actions to obtain a class definition for a given class name. These actions are implemented using the methods loadClass (408), loadClassByTokenDelegation (410), and loadClassByTokenDelegationLocally (412).

The TDCL illustrated in FIG. 4 uses the naming token T (402) and the delegation tokens D1, . . . , Dn (404) to provide a class definition when it is asked to do so by the runtime environment. The method loadClass (408) is called by the runtime environment to request a class definition from the TDCL. The loadClass method is the only method called by the runtime environment. The other methods implemented by the TDCL are used to implement the delegation by token mechanism. Table 1 illustrates pseudocode for the method loadClass.

TABLE 1

```
loadClass (name) : Class
begin
    return loadClassByTokenDelegation (name, [D₁,...,Dn])
end
```

Table 2 illustrates pseudocode for the method loadClassByTokenDelegation.

TABLE 2

```
loadClassByTokenDelegation (name, tokens) : Class
begin
    if(P is defined) then    //i.e., if this loader has a parent class loader
        if(P is a TDCL)
            C = P.loadClassByTokenDelegation(name, tokens)
        else
            C = P.loadClass(name)
        fi
    fi
    if(C is defined) //i.e., P was able to provide a class for the specified
    name
        return C
    else
        return loadClassByTokenDelegationLocally (name, tokens)
    fi
end
```

Table 3 illustrates pseudocode for the method loadClassByTokenDelegationLocally.

TABLE 3

```
loadClassByTokenDelegationLocally (name, tokens) : Class
begin
    // by some implementation dependent means try to obtain
    // C from the assigned class definition resources.
    . . .
    //end of non-specified code
    if (C is defined)
        return C
    else
        if (tokens [ ] non-empty)
            for all child loaders L of type TDCL that have a
            naming token that is in tokens
            begin
                C = L.loadClassByTokenDelegationLocally
                (name, tokens)
                if (C is defined)
                    return C
                fi
            end
        fi
    fi
end
```

Figure 5:
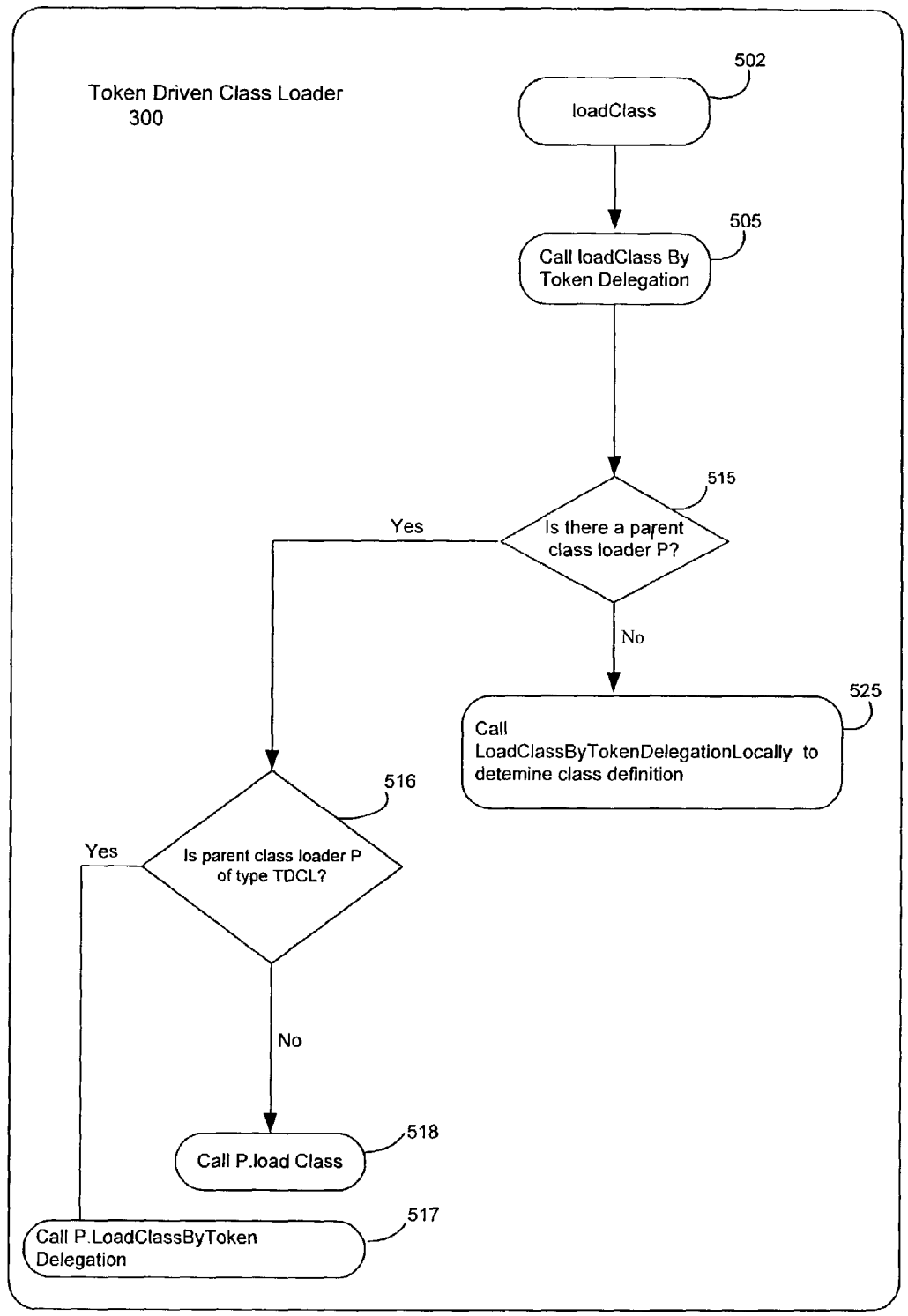
FIG. 5 is a flow diagram illustrating an implementation of a delegation by token mechanism.

FIG. 5 is a flow diagram of an implementation of a delegation by token mechanism in a TDCL (500). The runtime environment calls the method loadClass (step 502) in order to request a class definition from the TDCL. The TDCL calls the loadClassByTokenDelegation method passing on the class name and the loader's delegation tokens. If the parent class loader P associated with the TDCL is also of type TDCL (step 516), the TDCL calls its parent loader's method loadClassByTokenDelegation, passing on the class name and the currently effective delegation tokens as specified by the tokens parameter (step 517). If the parent class loader P is not of type TDCL, then the TDCL calls the loadClass method associated with P to obtain a class definition (step 518). If there is no parent class loader associated with the TDCL or if the delegation to the parent class loader was not successful (step 515), the TDCL calls the method loadClassByTokenDelegationLocally in order to obtain the class definition locally or, if appropriate, from one of its child class loaders (step 525).

Figure 6:
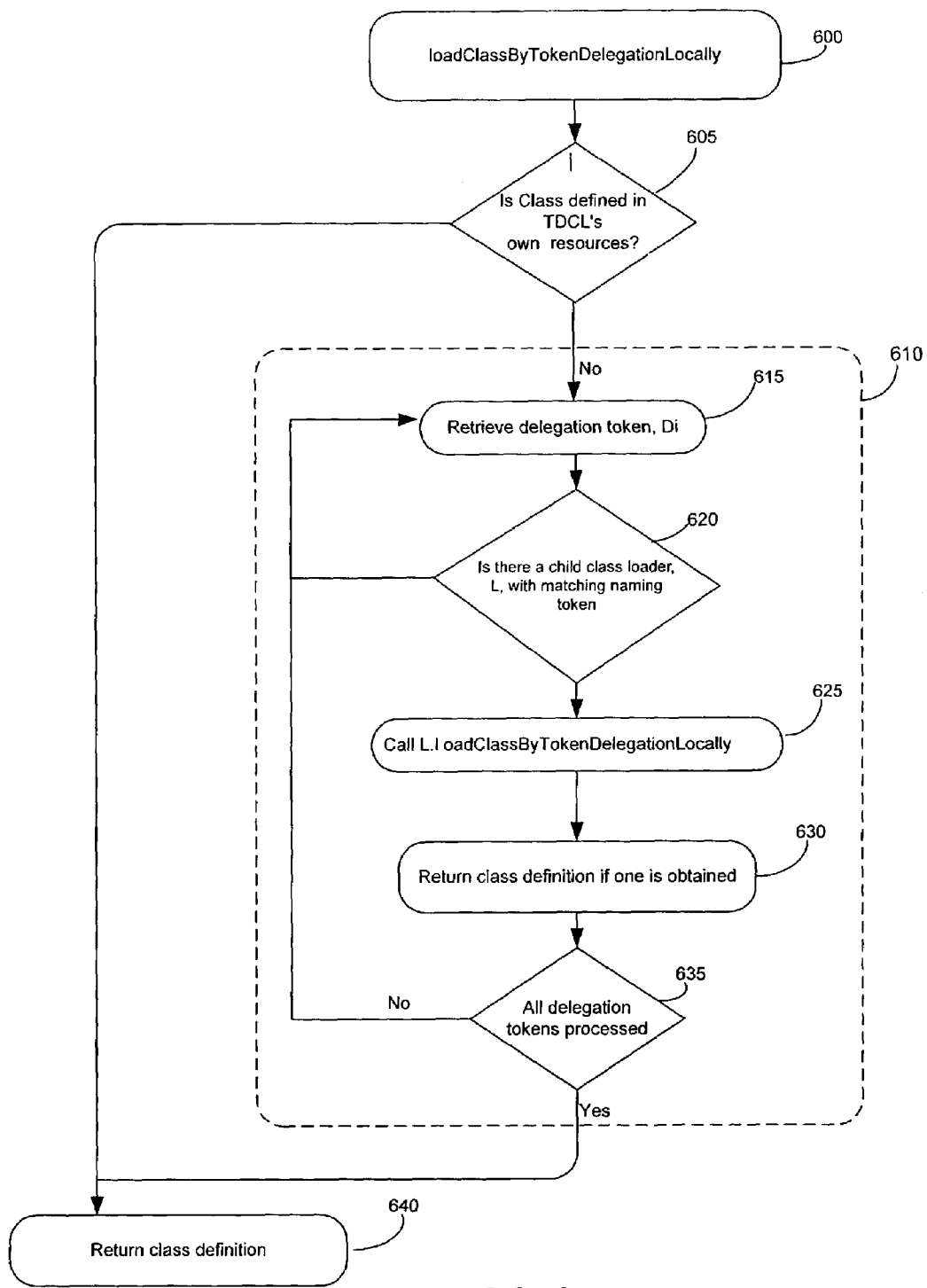
FIG. 6 illustrates the method loadClassByTokenDelegationLocally used by the token driven class loader.

FIG. 6 describes the method loadClassByTokenDelegationLocally used by the TDCL. The method loadClassByTokenDelegationLocally is called by a TDCL in the class hierarchy in order to obtain class definitions locally or from one of its child class loaders (step 600), if the parent class loader of the TDCL is not able to provide a class definition. The TDCL first looks at its own resources for the class definition and returns a class definition if it finds one (step 605). If the TDCL is unable to find a class definition using its own resources, it tries to obtain a class definition from the child class loaders of the TDCL (step 610) that are also of type TDCL. The two step, 605 and 610 can be performed in any sequence in a particular implementation of the TDCL. As shown in FIG. 6, the TDCL retrieves each delegation token associated with the TDCL in order to obtain a definition from one of the child class loaders (step 615) that is of type TDCL. The order in which the delegation tokens of the TDCL are processed is implementation specific. The TDCL checks whether there is a direct child loader that has a matching naming token (step 620). If a child class loader is found during step 620 whose naming token matches the current delegation token of the TDCL, the method LoadClassByTokenDelegationLocally for the matching child class loader is called to obtain a class definition (step 625). If a class definition is obtained (during step 630) or if no matching child class loader is found (during step 620), the set of delegation tokens associated with the TDCL is checked to determine whether there are delegation tokens that still need to be processed (step 635). If there are delegation tokens associated with the TDCL that still need to be processed, control returns to step 615, and the process repeats itself. The class definition obtained at the end of this process is returned by the TDCL (step 640). A specific implementation of the TDCL may decide to perform delegation to child loaders only until reaching a certain depth of delegation within the class loading hierarchy to have a most flexible shaping of class definition knowledge propagation.

The order in which a TDCL implementation checks the potential sources of a suitable class definition, the parent loader, its own resources, suitable child loaders, can be implementation specific. In one impementation of the TDCL, it is preferred to have class definitions flow from the root class loader to the class loaders that are lower in the hierarchy by checking the parent class loader first, the local resources of the class loader next, and the child class loaders whose naming token matches the current delegation token of the TDCL. The order in which the child class loaders with matching tokens are checked for a class definition is also implementation specific.

The delegation by token mechanism implemented by the TDCL as illustrated in FIG. 5 and FIG. 6 is backward compatible with the class loading delegation pattern implemented by the JAVA 2 environment. In a conventional JAVA 2 environment there is a tree of class loaders and the class definition knowledge propagates from the root of the tree to its leaves. In a conventional JAVA 2 environment the set of delegation tokens associated with the class is empty. Since the set of delegation tokens is empty, the TDCL will not delegate to child loaders. If there is no parent class loader associated with the TDCL or if the delegation to the parent class loader was not successful, the TDCL tries to obtain a class definition from the resources associated with the TDCL (step 605)

Figure 1:
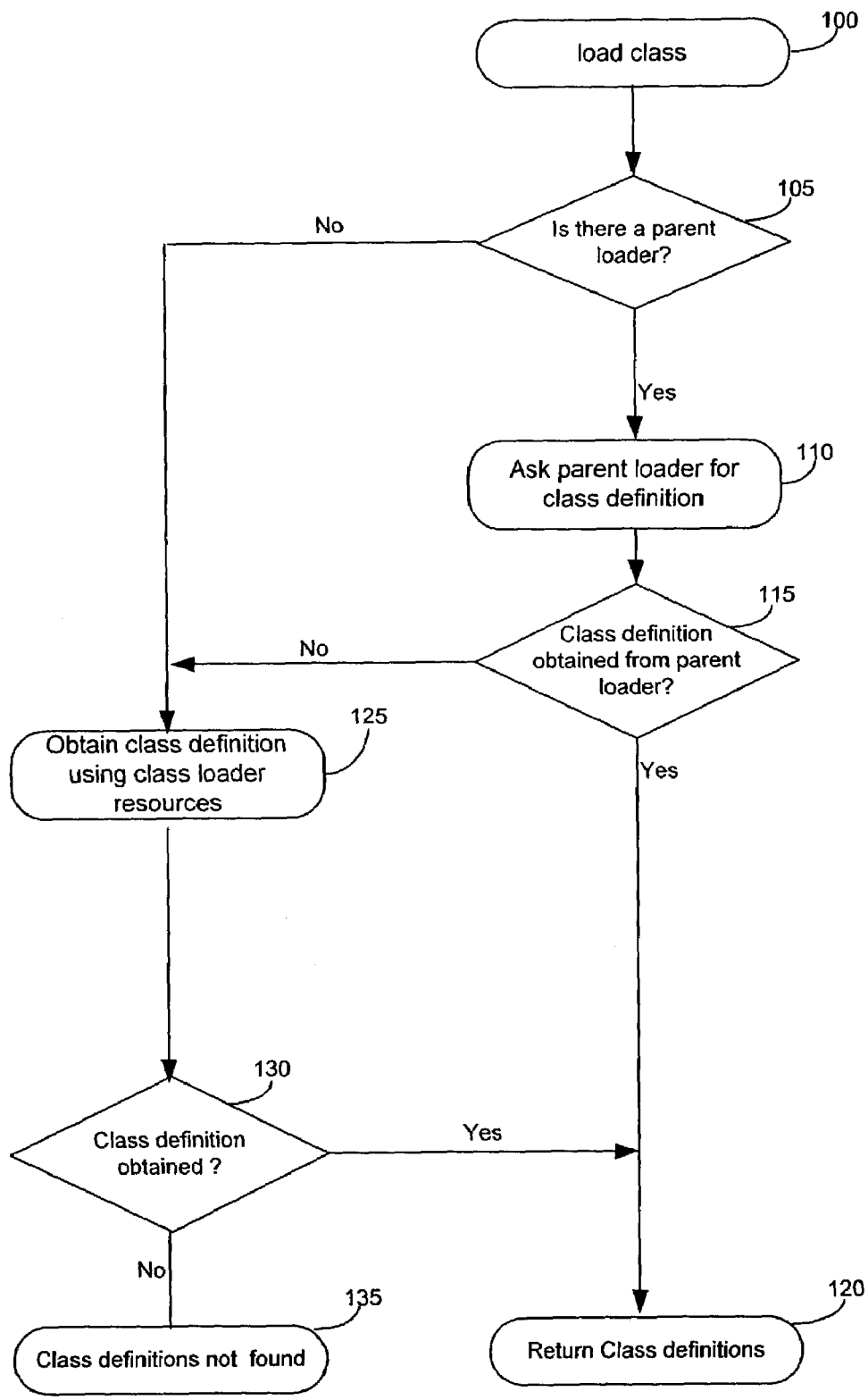
FIG. 1 illustrates the tree-based class loading delegation pattern implemented by the JAVA 2 environment.
Figure 2:
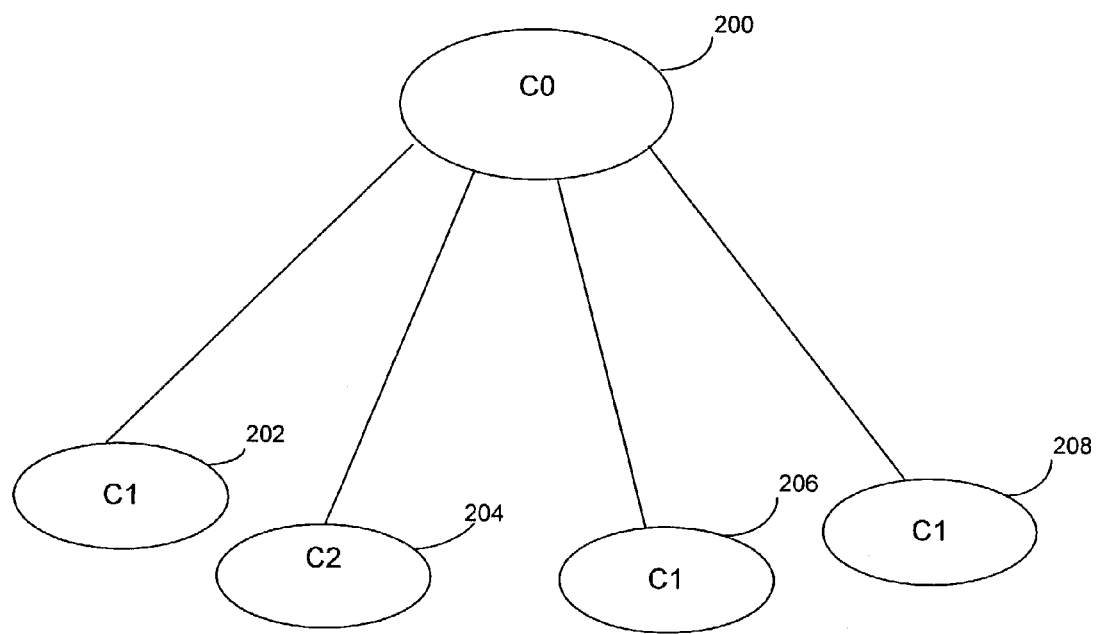
FIG. 2 illustrates an example of a class definition hierarchy that can be defined using the JAVA 2 class delegation pattern.
Figure 3:
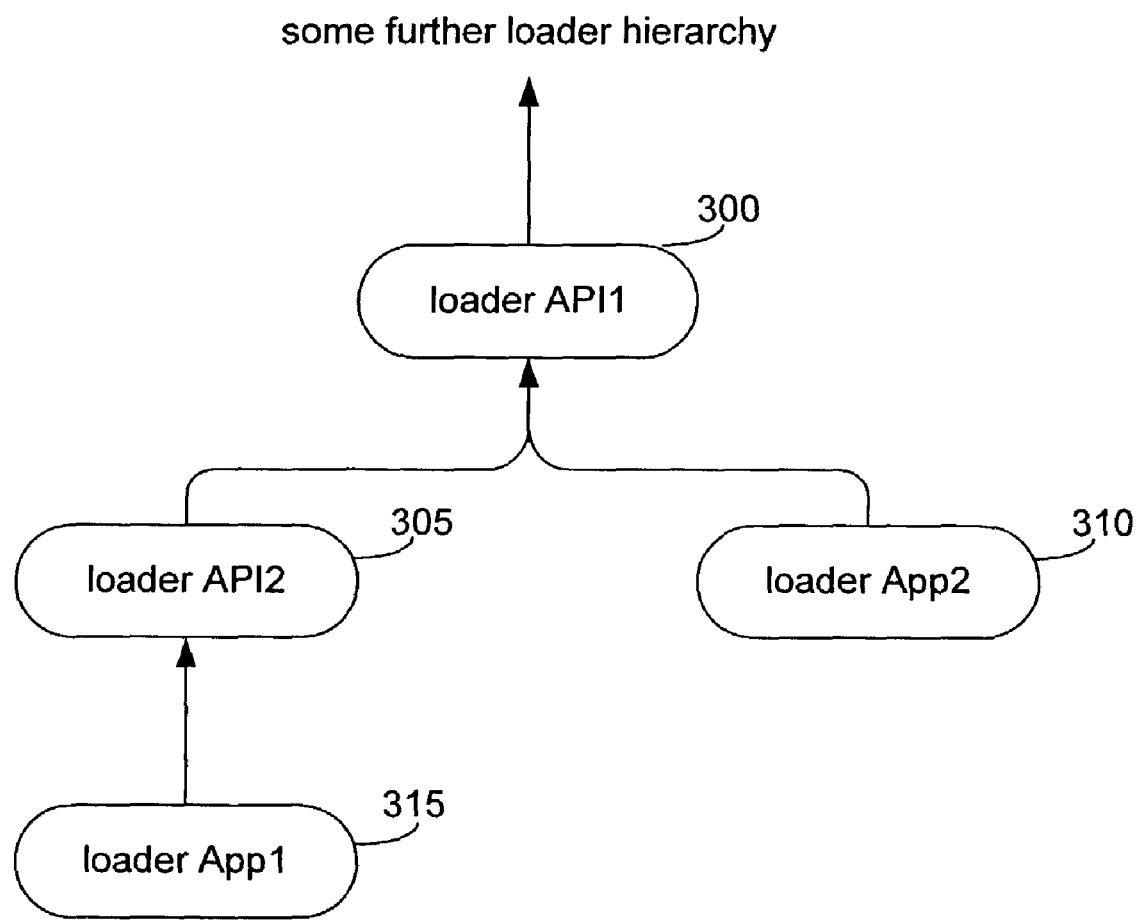
FIG. 3 illustrates an example of resolving dependency relationships between framework entities using tree-based class loaders.
Figure 7A:
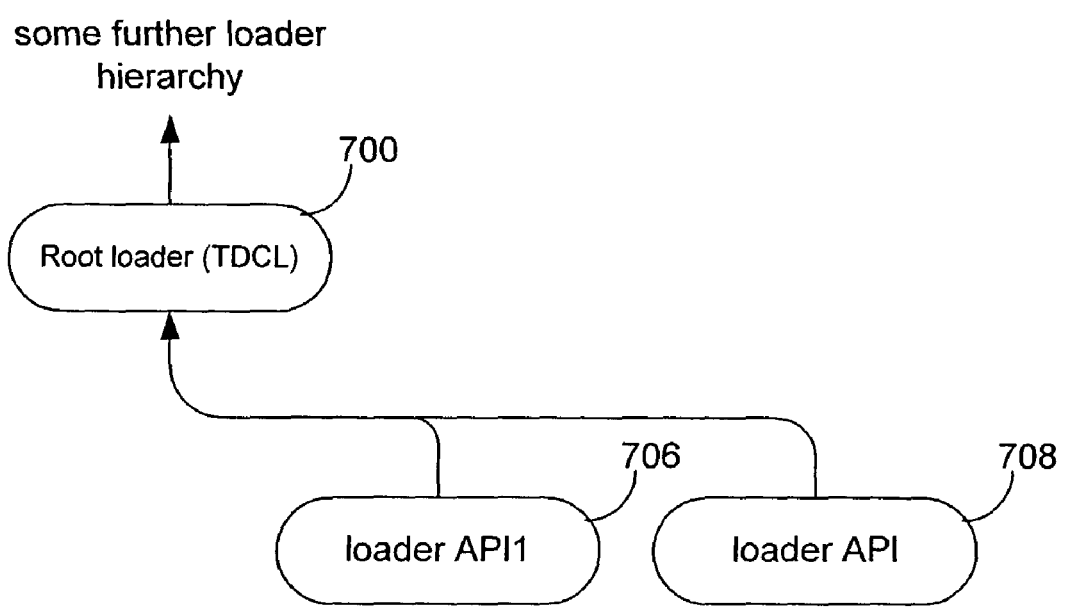
FIG. 7A illustrates an example of a hosting environment that provides two APIs.
Figure 7B:
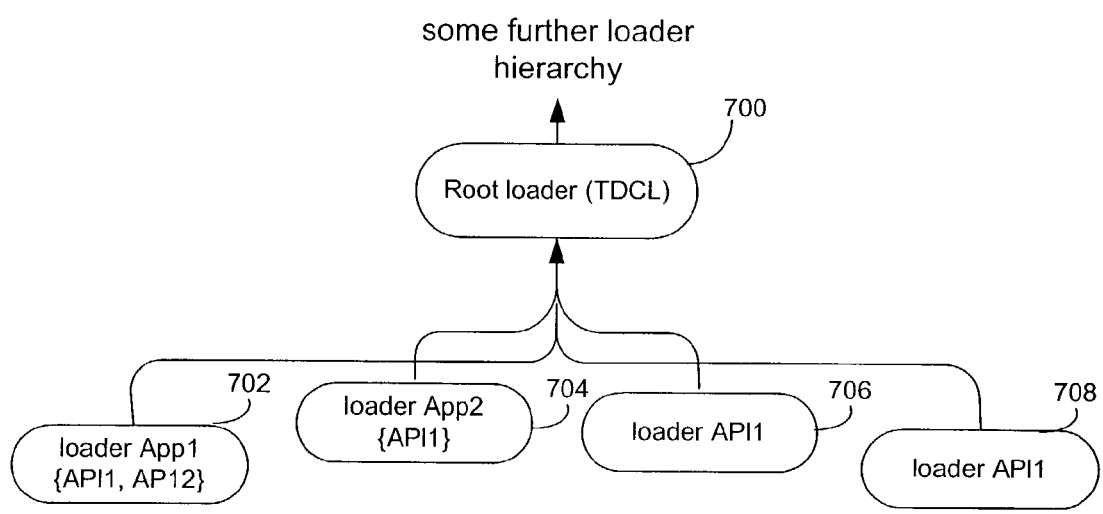
FIG. 7B illustrates an example of loading two applications that use the two APIs provided by the hosting environment.
Figure 7C:
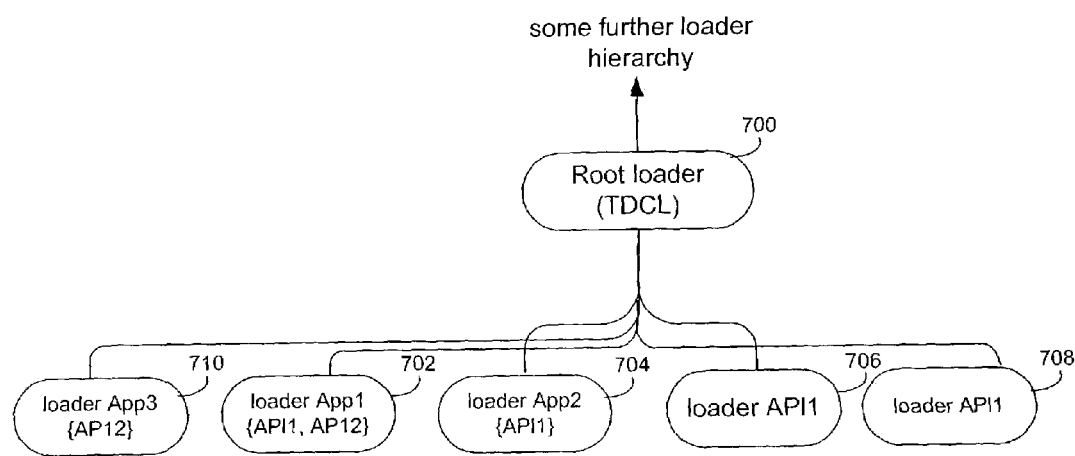
FIG. 7C illustrates an example loading a third application using API2 and not API1.

FIGS. 7A–7C show an example of a hosting environment similar to the environment described for FIG. 3. The environment provides two APIs, API1 and API2, that can be used by applications. This can be implemented by having a root class loader (700) that has two child loaders that provide API1 (706) and API2 (708) respectively. At runtime the hosting environment needs to set up application APP1 (702) to use API1 and API2, and application APP2 (704) to use only API1. This can be implemented if the root class loader and the loaders for the applications and the APIs are implemented using the TDCL method. Application App1 can be set up to use API1 and API2 by adding a child loader that contains delegation tokens for both API1 and API2. Application App2 can be set up to use only API1 by adding a child loader that contains only one delegation token for API1. In a next step, the environment is asked to set up application App3 that uses API2 but not API1. This can be achieved by adding a new child loader that contains a delegation token for API2.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a local area network ("LAN"), a wide area network ("WAN"), and the Internet.

The computer system can include clients and servers. A client and server are generally remote from each other and typically interact through a network, such as the described one. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer implemented method, comprising:
   receiving a request for a class definition in a first class loader in an arrangement of class loaders, the first class loader being a token driven class loader, each class loader having a naming token, and each token driven class loader having one or more associated delegation tokens;
   determining whether the first class loader has a parent class loader and, if so, whether the parent class loader is a token driven class loader, and if the first class loader has a parent class loader, requesting the class definition from the parent class loader, where if the parent class loader is a token driven class loader, requesting the class definition comprises using the delegation tokens to delegate the class definition request to the parent class loader;
   if the class definition is not obtained from a parent class loader, attempting to obtain the class definition from the resources of the first class loader; and
   if the class definition is not obtained from a parent class loader or from the resources of the first class loader, using the delegation tokens of the first class loader to find a matching child class loader and requesting the class definition from the matching child class loader.

2. The method of claim 1, wherein using the delegation tokens to find a matching child class loader includes:
   identifying a child class loader that has a naming token that matches one of the delegation tokens associated with the first class loader.

3. A computer implemented method, comprising:
   receiving a request for a class definition and delegation tokens associated with the request in a first class loader in an arrangement of class loaders, the first class loader being a token driven class loader, each class loader having a naming token;
   determining whether the first class loader has a parent class loader and, if so, whether the parent class loader is a token driven class loader, and if the first class loader has a parent class loader, requesting the class definition from the parent class loader, where if the parent class loader is a token driven class loader, requesting the class definition comprises using the delegation tokens to delegate the class definition request to the parent class loader;

if the class definition is not obtained from a parent class loader, attempting to obtain the class definition from the resources of the first class loader; and if the class definition is not obtained from a parent class loader or from the resources of the first class loader, using the delegation tokens of the first class loader to find a matching child class loader and requesting the class definition from the matching child class loader.

4. The method of claim 3, wherein using the delegation tokens to find a matching child class loader includes:

identifying a child class loader that has a naming token that matches one of the delegation tokens associated with the first class loader.

5. A computer program product, tangibly embodied in an information carrier, the computer program product comprising instructions operable to cause data processing equipment to:

receive a request for a class definition in a first class loader in an arrangement of class loaders, the first class loader being a token driven class loader, each class loader having a naming token, and each token driven class loader having one or more associated delegation tokens;

determine whether the first class loader has a parent class loader and, if so, whether the parent class loader is a token driven class loader, and if the first class loader has a parent class loader, request the class definition from the parent class loader, where if the parent class loader is a token driven class loader, requesting the class definition comprises using the delegation tokens to delegate the class definition request to the parent class loader;

if the class definition is not obtained from a parent class loader, attempt to obtain the class definition from the resources of the first class loader; and if the class definition is not obtained from a parent class loader or from the resources of the first class loader, use the delegation tokens of the first class loader to find a matching child class loader and request the class definition from the matching child class loader.

6. The computer program product of claim 5, wherein the instructions for using the delegation tokens to find a matching child class loader cause the data processing equipment to:

identify a child class loader that has a naming token that matches one of the delegation tokens associated with the first class loader.

7. A computer program product, tangibly embodied in an information carrier, the computer program product comprising instructions operable to cause data processing equipment to:

receive a request for a class definition and delegation tokens associated with the request in a first class loader in an arrangement of class loaders, the first class loader being a token driven class loader, each class loader having a naming token;

determine whether the first class loader has a parent class loader and, if so, whether the parent class loader is a token driven class loader, and if the first class loader has a parent class loader, request the class definition from the parent class loader, where if the parent class loader is a token driven class loader, requesting the class definition comprises using the delegation tokens to delegate the class definition request to the parent class loader;

if the class definition is not obtained from a parent class loader, attempt to obtain the class definition from the resources of the first class loader; and if the class definition is not obtained from a parent class loader or from the resources of the first class loader, use the delegation tokens of the first class loader to find a matching child class loader and request the class definition from the matching child class loader.

8. The computer program product of claim 7, wherein the instructions for using the delegation tokens to find a matching child class loader cause the data processing equipment to:

identify a child class loader that has a naming token that matches one of the delegation tokens associated with the first class loader.

* * * * *